July 10, 1928.
H. E. GORDON ET AL
1,676,948
ELECTRIC SIGNAL FOR AUTOMOBILES
Filed Nov. 29, 1922
2 Sheets-Sheet 2
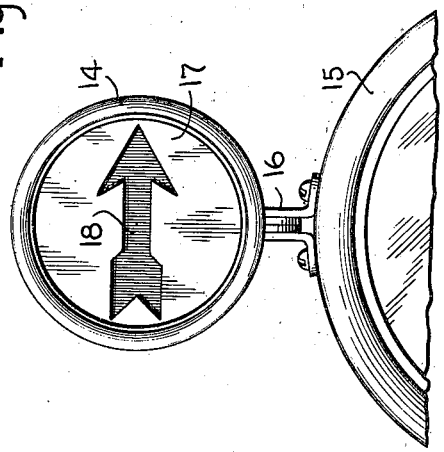
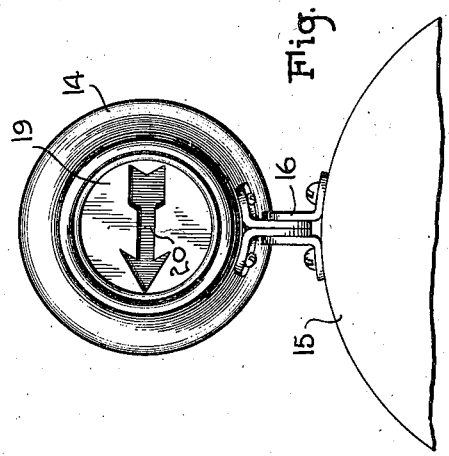
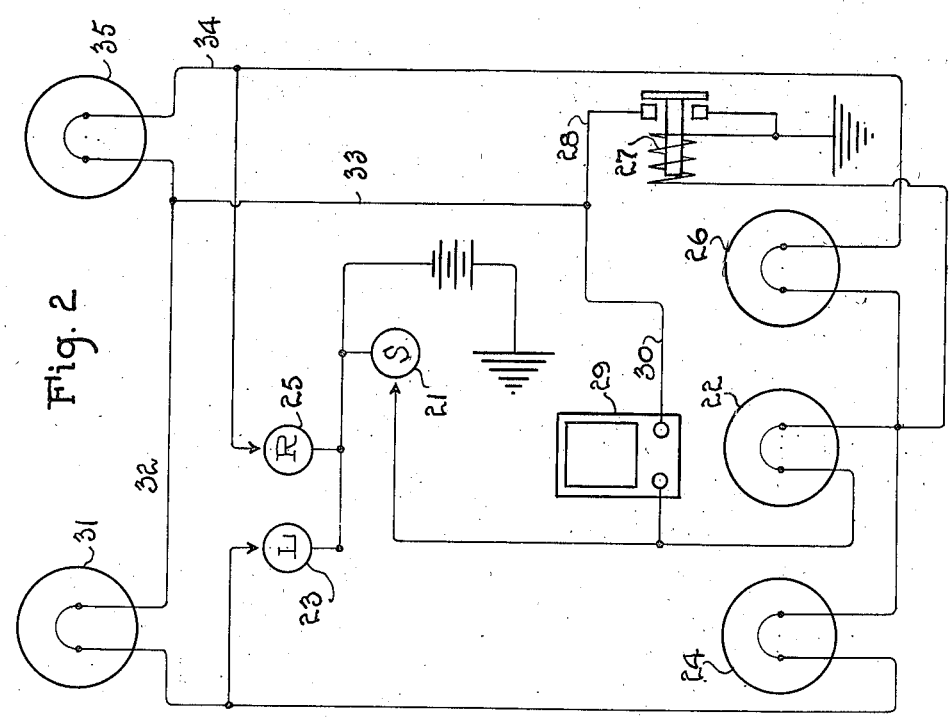
WITNESSES
Harry E. Gordon
George D. Gordon INVENTORS
BY
ATTORNEY Patented July 10, 1928.

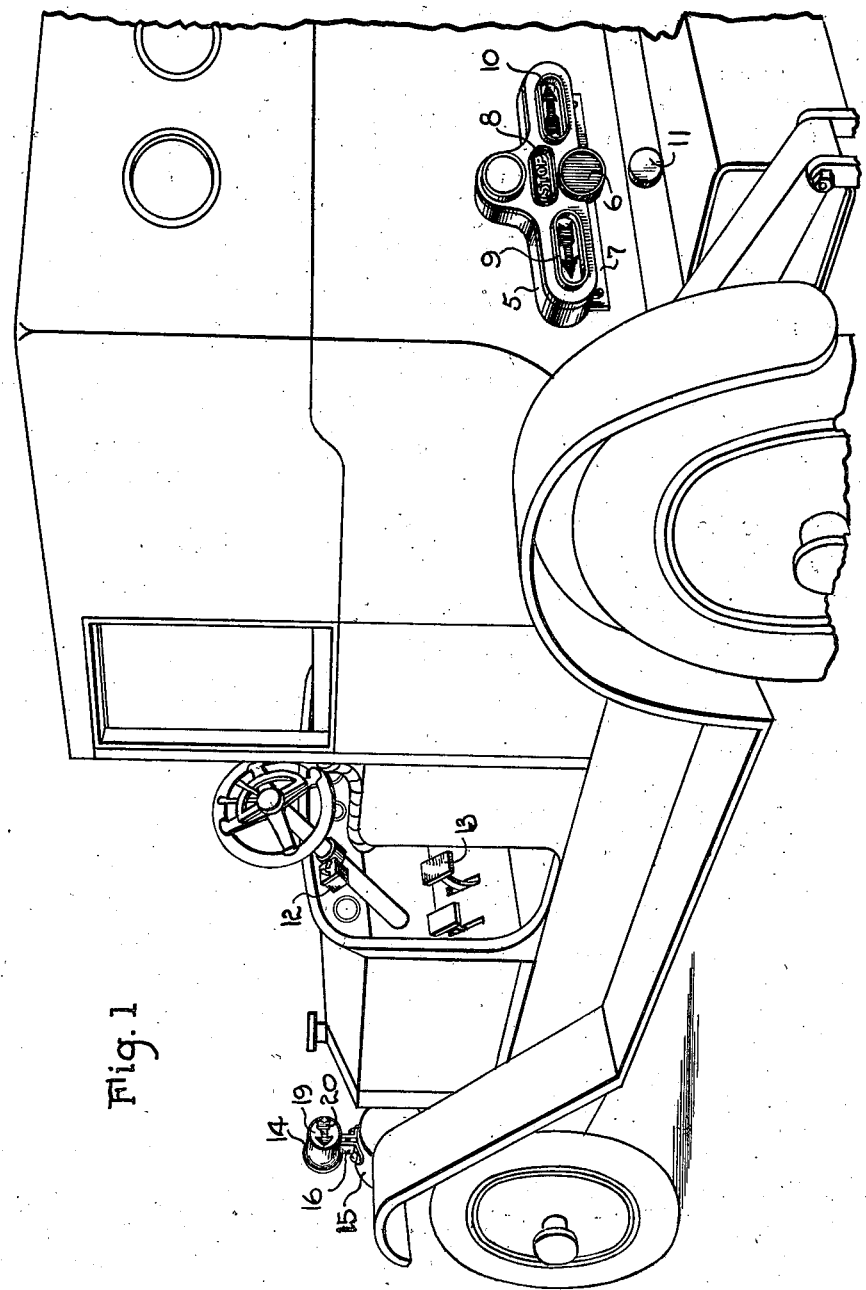

1,676,948

UNITED STATES PATENT OFFICE.

HARRY E. GORDON AND GEORGE D. GORDON, OF ROCHESTER, NEW YORK.

ELECTRIC SIGNAL FOR AUTOMOBILES.

Application filed November 29, 1922. Serial No. 604,067.

This invention relates to an electric signal adapted to be used on automobiles, to indicate to other motorists, the intention of the driver to stop or to make a right or left hand turn.

One of the objects of the present invention is to provide improved means whereby to inform the driver whenever the signal at the rear of the automobile is not working properly.

A further object of the invention is to provide a light casing in which the signal at the forward end of the automobile may be displayed, and which will be also visible to motorists attempting to pass from the rear, at the same time providing means easily visible to the driver which will show him not only that the front signal light is properly functioning, but owing to the means by which it is operated, will also notify him that the rear light is also functioning properly. These objects are accomplished without the use of a pilot light such as is often employed.

In carrying out our invention, the wiring is so arranged that upon closing the circuit through one of the rear signal lights, a relay is operated which closes a parallel circuit through one of the front signal lights, or through a buzzer, the casing for the front signal light being so constructed that the light therein is visible to the driver.

The invention will be best understood from the following description taken in connection with the accompanying drawings, which show the details of construction of one form in which our invention may be carried out.

In the drawings:—

Fig. 1 is a perspective view of an automobile having our invention installed thereon.

Fig. 2 is a diagrammatic view of the wiring used in connection with the invention.

Fig. 3 is a front elevation of the front signal light casing and its mounting.

Fig. 4 is a rear elevation thereof.

Referring more specifically to the drawings, the automobile is provided at its rear end with a signal light casing 5 of special design, which includes a lens 6, through which the usual tail-light is displayed, and a depending flange 7 to which the license plate may be secured. The casing 5 is also provided with a window 8 through which a light may be displayed whenever it is the intention of the driver to stop, and also with windows 9 and 10 showing illuminated arrows to designate a right or left hand turn. In some convenient place near the rear signal lights, preferably beneath the rear part of the automobile body, is located a buzzer 11. The right and left hand signal lights are preferably operated from a switch-box 12 on the steering wheel spindle, and the stop light may be operated by a switch which is automatically closed by means of a brake pedal 13 in the manner well known to those skilled in the art.

Whenever the driver stops, the signal light is displayed through the window 8, and the buzzer 11 is operated to attract the attention of motorists approaching from the rear; the means for operating the light and buzzer being hereinafter more particularly described. When it is the driver's intention to turn to the right or left, the corresponding rear signal light 9 or 10 will be displayed, and it is also necessary in order to insure complete safety to display a similar signal at the front. For this purpose, we provide a signal light casing 14 to be mounted on each headlight 15 by means of a suitable bracket 16. Each casing 14 has a front lens 17 of comparatively large size which is provided with an arrow 18 denoting the direction to be taken. The casing 14 is also provided with a rear lens 19 of smaller size, which is also provided with a corresponding arrow 20 visible not only to the driver but also to motorists who may be attempting to pass from the rear.

The method of wiring our improved signal system is fully disclosed in Fig. 2. In this figure, the switch 21 is operated to close a circuit through the stop signal light 22, 23 indicates a switch for the left hand signal light 24, and 25 indicates a switch for the right hand signal light 26. It will be noted that each of the lights 22, 24 and 26 is connected in series with the electro-magnet 27 that operates a relay which closes a parallel circuit 28. Upon closing the circuit through the stop light 2, by means of switch 21, it will be seen that a current will also pass through the buzzer 29 and wires 30 and 28, so that the buzzer will be operated not only to attract the attention of motorists approaching from the rear, but also to notify the driver that the stop signal is working properly. Whenever the switch 23 is closed to display the left hand signal light 24, the relay will close the circuit which passes through switch 23, the left hand front signal light 31 and wires 32, 33 and 28. Whenever the switch 25 is closed to display the rear right hand signal light 26, the relay will also be closed and a circuit set up through switch 25, wire 34, right hand front signal light 35 and wires 33 and 28.

It will be seen, therefore, that whenever a right or left hand signal light is displayed at the rear, a corresponding signal light will be displayed at the front, and by means of the rear lens 19, the driver will know if the rear signal is operating properly. This lens 19 not only takes the place of a pilot light, which is sometimes used, but it also furnishes a very necessary signal which is visible to automobilists who are at one side of the path of the automobile on which the signal is displayed and who may be too far advanced to observe the rear signal lights.

From the foregoing description, it will be seen that we have devised a signal that fulfills all necessary requirements for a complete safety directional signal positive in operation and simple in construction. The intention of the driver is made known to persons in front or in the rear or at either side, and the driver always knows positively that the signals are properly functioning.

In case the rear lamp corresponding to the switch operated is burned out or broken, the relay will not operate and the corresponding front lamp will not light, thus indicating that the rear lamp is not lighted. The failure of one of the rear lights will not interfere with the proper operation of the others, the front lamp failing to light only when the corresponding rear lamp is not lighted.

We have shown and described specifically the details of one form in which the principles of our invention may be embodied, but it will be understood that modifications may be made therein without departing from the scope of the invention as defined in the claim.

What is claimed is:—

In a signal system for automobiles, the combination of means for displaying an electric signal at the rear denoting a right or left hand turn, said means including an electric circuit and a circuit closer, said circuit including a relay, a second circuit having contacts closed by the operation of the relay when the first-mentioned circuit is closed, a front signal light in said second circuit which is visible to the driver, another circuit through the relay winding having an individual circuit closer, a rear stop signal in said last-mentioned circuit, and a circuit through said contacts and said last-mentioned circuit closer connected in parallel with said second circuit and including an audible signal adjacent to the stop signal, whereby to attract the attention of drivers in the rear when the stop signal is displayed.

In testimony that we claim the foregoing as our own we have hereto affixed our signatures.

HARRY E. GORDON.
GEORGE D. GORDON.